(12) United States Patent
Yamamoto et al.

(10) Patent No.: US 9,411,501 B2
(45) Date of Patent: Aug. 9, 2016

(54) ELECTRONIC DEVICE AND TOUCH OPERATION PROCESSING METHOD

(75) Inventors: Toru Yamamoto, Kanagawa (JP); Shigeru Enomoto, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 27 days.

(21) Appl. No.: 13/604,924

(22) Filed: Sep. 6, 2012

(65) Prior Publication Data

US 2013/0127749 A1 May 23, 2013

(30) Foreign Application Priority Data

Nov. 22, 2011 (JP) ................................. 2011-255502

(51) Int. Cl.
*G06F 3/041* (2006.01)
*G06F 3/0488* (2013.01)

(52) U.S. Cl.
CPC .... *G06F 3/0488* (2013.01); *G06F 2203/04808* (2013.01)

(58) Field of Classification Search
None
See application file for complete search history.

(56) References Cited

U.S. PATENT DOCUMENTS

| 6,459,424 | B1 * | 10/2002 | Resman | G06F 3/044 345/173 |
| 6,489,951 | B1 * | 12/2002 | Wong et al. | 345/173 |
| 8,341,306 | B1 * | 12/2012 | Luttman | G06F 9/4411 710/13 |
| 8,902,194 | B2 | 12/2014 | Fukuda | |
| 2002/0112018 | A1 | 8/2002 | Kaminagayoshi | |
| 2003/0234768 | A1 * | 12/2003 | Rekimoto | G06F 3/0488 345/169 |
| 2006/0025920 | A1 * | 2/2006 | Nezu | G01C 21/36 701/532 |
| 2006/0026535 | A1 * | 2/2006 | Hotelling et al. | 715/863 |
| 2007/0236471 | A1 * | 10/2007 | Yeh | G06F 3/0416 345/173 |
| 2008/0165136 | A1 * | 7/2008 | Christie et al. | 345/173 |
| 2008/0250354 | A1 | 10/2008 | Park | |
| 2008/0297482 | A1 | 12/2008 | Weiss | |
| 2009/0044141 | A1 * | 2/2009 | Hayashi | G06F 3/04817 715/772 |
| 2009/0210810 | A1 * | 8/2009 | Ryu et al. | 715/769 |
| 2010/0245274 | A1 | 9/2010 | Fukuda | |

FOREIGN PATENT DOCUMENTS

| CN | 101201720 A | 6/2008 |
| CN | 101510140 A | 8/2009 |
| EP | 1933243 | 6/2008 |
| EP | 2090972 A2 | 8/2009 |
| JP | 2006276910 A | 10/2006 |

(Continued)

OTHER PUBLICATIONS

Office Action for corresponding CN Application No. 2012104575282, dated Apr. 3, 2015.

(Continued)

*Primary Examiner* — Nicholas Lee
(74) *Attorney, Agent, or Firm* — Matthew B. Dernier, Esq.

(57) ABSTRACT

An electronic device is provided with a touch panel configured to include a display device and a touch pad or is connected to the touch panel. A display control unit displays a list of items on a display device. A first reception unit receives a first touch operation in a selection area of an item. A second reception unit receives a second touch operation for moving the list of items. A selection control unit selects one or more items in accordance with a specified position on a front touch pad specified by the first touch operation and with the movement of the list of items by the display control unit.

18 Claims, 15 Drawing Sheets

(56) References Cited

FOREIGN PATENT DOCUMENTS

| JP | 2010225016 A | 10/2010 |
| WO | 2007148040 A1 | 12/2007 |

OTHER PUBLICATIONS

Office Action for corresponding Japanese Application No. 2011-255502, dated Jun. 16, 2015.

* cited by examiner

ELECTRONIC DEVICE AND TOUCH OPERATION PROCESSING METHOD

BACKGROUND OF THE INVENTION

1. Field of the Invention

The present invention relates to an electronic device provided with a multi-touch screen or an electronic device that connects to a multi-touch screen.

2. Description of the Related Art

Electronic devices such as portable game devices, PDA's (Personal Digital Assistant), and the like have become widely used. In recent years, multifunctional electronic devices such as smartphones have been introduced in which functions of portable phones, PDA's, and the like are put together into one.

Electronic devices having touch panels provide an excellent user interface that allows the user to operate intuitively. For example, commonly-used interfaces include user interfaces and the like that allow a content image displayed in a thumbnail form to be tapped using a finger so as to display the content image on the entire panel or that allow a display image to be scrolled by tracing the surface of a panel using a finger. In recent years, electronic devices have also been introduced that are provided with a multi-touch screen having a function of detecting a plurality of concurrently-touched points, and user interfaces have also been put into practical use that allow a display image to be zoomed in (enlarged) or zoomed out (reduced) by a pinch operation by the user.

[patent document No. 1] US Patent Application No. 2002-0112018

Large-capacity memories allow electronic devices to record many content files in the memories. When the user transfers content files to another electronic device, the user selects a plurality of content files to be transferred from a list of content displayed on a display of the electronic device so as to transfer the selected content files all at once. Therefore, the development of a user interface has been desired that allows the user to efficiently select content files, particularly, when there is a large number of items of content.

SUMMARY OF THE INVENTION

Accordingly, a purpose of the present invention is to provide a technology for efficiently selecting content from a list.

An electronic device according to one embodiment of the present invention is configured to be provided with a touch panel including a display device and a touch pad or is configured to be connected to the touch panel, including: a display control unit configured to display a list of items on the display device; a first reception unit configured to receive a first touch operation in a selection area of an item; a second reception unit configured to receive a second touch operation for moving the list of items; and a selection control unit configured to select one or more items in accordance with the first touch operation. The display control unit moves the list of items in accordance with the second touch operation, and the selection control unit selects one or more items in accordance with a specified position on the touch pad specified by the first touch operation and with the movement of the list of items by the display control unit.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

An electronic device according to the present embodiment provides a user interface that allows content to be efficiently selected from a list. For example, the electronic device is a portable game device or a smartphone and is provided with a multi-touch screen that allows for a multi-touch operation performed by the user. The electronic device may be configured such that the electronic device is connected to the multi-touch screen so as to receive a touch operation detected on the multi-touch screen. The electronic device may be connected to the multi-touch screen by wire or wirelessly at this time. The electronic device may be of a portable or console type.

A system is shown in the following where a first electronic device and a second electronic device are connected so that a content file is transferred from the first electronic device to the second electronic device. When the user selects, from a content list displayed on a multi-touch screen of the first electronic device, a plurality of files to be transferred and presses a transfer button, the plurality of selected files are transferred to the second electronic device.

Figure 1:
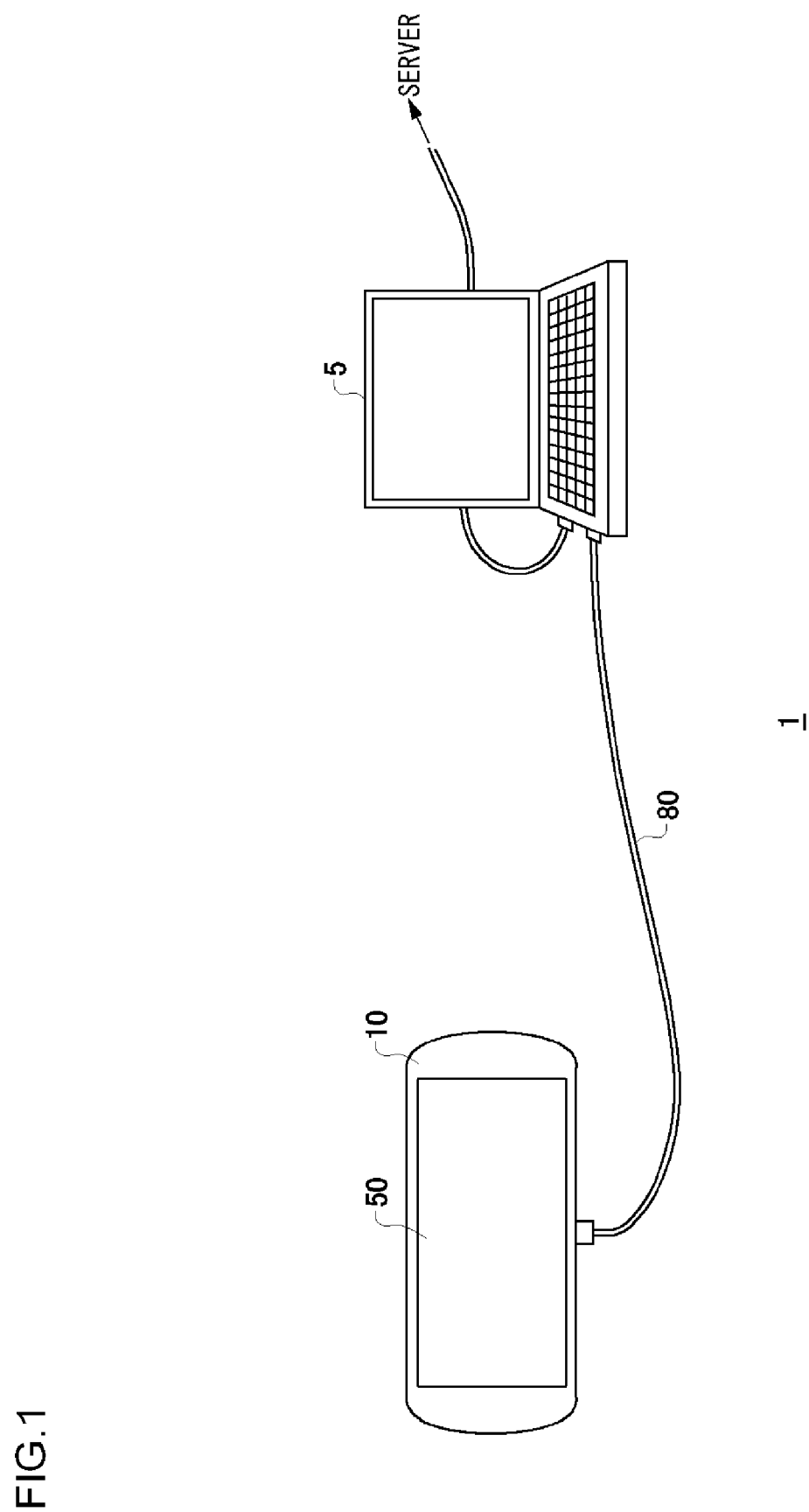
FIG. 1 is a diagram illustrating a file transfer system.

FIG. 1 illustrates a file transfer system in which two electronic devices are connected. In a file transfer system 1, an electronic device 10 serves as a first electronic device and a personal computer (PC) 5 serves as a second electronic device. The electronic device 10 and the PC 5 are connected via a USB (Universal Serial Bus) cable 80. However, the electronic device 10 and the PC 5 may be connected via a wired network such as a LAN (Local Area Network) or the Internet or may be connected via a wireless LAN or the like. The PC 5 is connected to a server on the Internet to download driver software that is described later.

The electronic device 10 is provided with a touch panel 50 that is capable of detecting a plurality of concurrently-touched points and operates as an information terminal device for transferring files. The electronic device 10 may be connected to a multi-touch screen without having the touch panel 50 so as to acquire position information of a plurality of concurrently-touched points. The PC 5 operates as an information terminal device that receives a file. The second electronic device is not limited to the PC 5 and may be a game device.

In the file transfer system 1, file transfer processing between the electronic device 10 and the PC 5 is managed by an application installed in the electronic device 10. This application is hereinafter referred to as a "content manager." The user performs file transfer from the electronic device 10 to the PC 5 using the content manager. When a driver software (hereinafter, simply referred to as a "driver") is installed on the PC 5, the content manager manages file transfer processing between the electronic device 10 and the PC 5.

In a storage area for mass storage, the electronic device 10 stores a virtual CD-ROM in which an installer of the driver is included. When the PC 5 accesses the virtual CD-ROM, the installer is activated, and the PC 5 automatically accesses a server and installs a driver. An explanation is given in the following regarding an operation that occurs when the electronic device 10 and the PC 5 are connected via the USB cable 80.

When the electronic device 10 and the PC 5 are connected via the USB cable 80, the electronic device 10 accesses the PC 5 via Media Transfer Protocol (MTP). If the driver has already been installed in the PC 5 at this time, the driver returns a response, and the file transfer processing is performed by the content manager. On the other hand, if the driver has not been installed in the PC 5, the electronic device 10 does not receive a response and displays a button that can be operated by the user as well as an error message stating "failed to connect to device" on a display device of the touch panel 50.

When the user taps the button, the electronic device 10 cuts off communication via the MTP and becomes connected to the PC 5 as a mass storage. A tap operation generates an instruction for performing a function mapped to a tap position. The PC 5 perceives that a virtual CD-ROM drive stored in the memory of the electronic device 10 is connected and autoruns the virtual CD-ROM. The virtual CD-ROM includes an installer that allows the PC 5 to access a server on the Internet so as to search for a driver and then automatically install the driver in the PC 5 when the virtual CD-ROM is run and the installer is activated.

When the installer is activated, a button that can be operated by the user is displayed as well as a message stating "install driver" on a PC screen. When the user presses the button on the PC screen using a mouse or the like, the installer downloads a driver from the server and installs the driver in the PC 5. Upon completion of the installation, the installer displays a message indicating that the installation has been completed on the PC screen and displays an icon of the content manager on a screen of the electronic device 10 in a flashing manner. When the user taps the icon, the content manager is activated and connects the electronic device 10 and the PC 5 via the MTP. As described, the electronic device 10 can automatically install a driver in the PC 5 by storing the virtual CD-ROM that includes the installer in advance in the area of the memory used for mass storage. Thus, an environment can be achieved in which the content manager of the electronic device 10 can manage the file transfer processing between the electronic device 10 and the PC 5.

An explanation is given in the following regarding the exterior configuration and circuit configuration of the electronic device 10 according to the present embodiment. The electronic device 10 shown in the following is a portable game device. The electronic device 10 may be a portable terminal device of other types. Alternatively, the electronic device 10 may be a console terminal device.

[Configuration of Front Surface Portion]

Figure 2A:
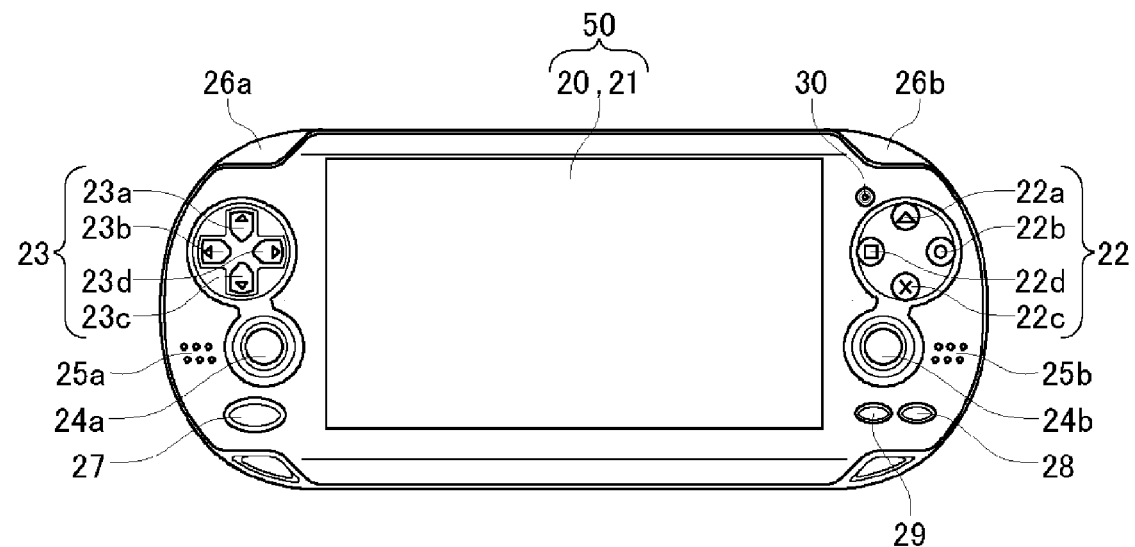
FIG. 2A is a diagram illustrating the front surface of an electronic device.

FIG. 2A illustrates the front surface of the electronic device 10. The electronic device 10 is formed of a horizontally-long housing, and the left and right areas held by the user each have an arc-shaped outline contour. A rectangular touch panel 50 is provided on the front surface of the electronic device 10. The touch panel 50 comprises a display device 20 and a transparent front touch pad 21 that covers the surface of the display device 20. The display device 20 is an organic EL (Electro-Luminescence) panel having a screen aspect ratio of 16:9 and displays an image. The display device 20 may be a display means such as a liquid crystal panel or the like. The front touch pad 21 is a multi-touch pad having a function of detecting a plurality of points that are touched concurrently, and the touch panel 50 is formed as a multi-touch screen.

A triangle button 22$a$, a circle button 22$b$, a cross button 22$c$, and a square button 22$d$ each located at a vertex of a rhomboid (hereinafter, generically referred to as "operation buttons 22") are provided on the right side of the touch panel 50. An up key 23$a$, a left key 23$b$, a down key 23$c$, and a right key 23$d$ (hereinafter, generically referred to as "directional keys 23") are provided on the left side of the touch panel 50. The user can input eight directions, up, down, left, and right directions and oblique directions, by operating the directional keys 23. A left stick 24$a$ is provided below the directional keys 23, and a right stick 24$b$ is provided below the operation buttons 22. The user tilts the left stick 24$a$ or the right stick 24$b$ (hereinafter, generically referred to as "analog sticks 24") so as to input a direction and the amount of a tilt. An L button 26$a$ and an R button 26$b$ are provided at the left and right top of the housing, respectively. The operation buttons 22, directional keys 23, the analog sticks 24, the L button 26$a$, and the R button 26$b$ form operation means operated by the user.

A front camera 30 is provided near the operation buttons 22. A left speaker 25$a$ and a right speaker 25$b$ that output sounds (hereinafter, generically referred to as "speakers 25") are provided on the left side of the left stick 24$a$ and on the right side of the right stick 24$b$, respectively. A HOME button 27 is provided below the left stick 24$a$, and a START button 28 and a SELECT button 29 are provided below the right stick 24$b$.

[Configuration of Rear Surface Portion]

Figure 2B:
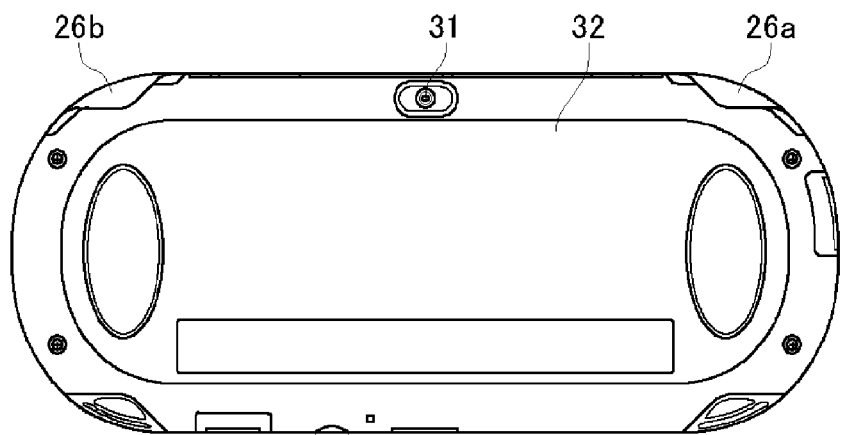
FIG. 2B is a diagram illustrating the rear surface of the electronic device.

FIG. 2B illustrates the rear surface of the electronic device 10. A rear camera 31 and a rear touch pad 32 are provided on the rear surface of the electronic device 10. The rear touch pad 32, as in the case of the front touch pad 21, is formed as a multi-touch pad. The electronic device 10 is provided with the two cameras and touch pads on the front and rear surfaces.

[Configuration of Top Surface Portion]

Figure 3A:
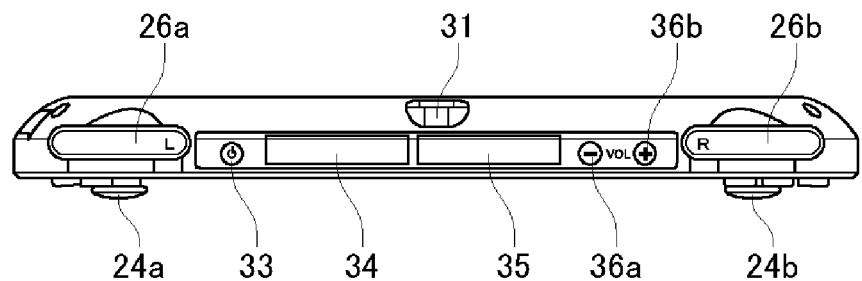
FIG. 3A is a diagram illustrating the upper surface of the electronic device.

FIG. 3A illustrates the top surface of the electronic device 10. As described previously, the L button 26$a$ and the R button 26$b$ are provided at the left and right edges of the top surface of the electronic device 10, respectively. A power button 33 is provided on the right side of the L button 26a, and the user turns the power on or off by pressing the power button 33. The electronic device 10 has a power control function of transitioning to a suspend state when a time period during which the operation means is not operated (no operation time period) lasts for a predetermined period of time. When the electronic device 10 enters the suspend state, the user can bring the electronic device 10 back to an awake state from the suspend state by pressing the power button 33.

A game card slot 34 is a slot for inserting a game card. In the figure, the game card slot 34 covered by a slot cover is shown. An LED lamp that flashes when the game card is being accessed may be provided near the game card slot 34. An accessory terminal 35 is for connecting peripheral devices (accessories). In the figure, the accessory terminal 35 is shown being covered by a terminal cover. A negative button 36a and a positive button 36b for adjusting the volume are provided between the accessory terminal 35 and the R button 26b.

[Configuration of Bottom Surface Portion]

Figure 3B:
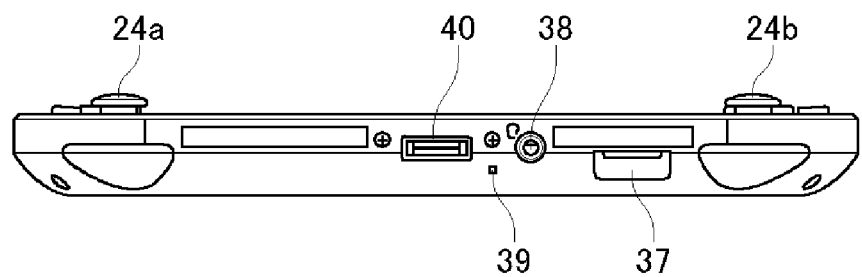
FIG. 3B is a diagram illustrating the bottom surface of the electronic device.

FIG. 3B illustrates the bottom surface of the electronic device 10. A memory card slot 37 is a slot for inserting a memory card. In the figure, the memory card slot 37 covered by a slot cover is shown. A sound input and output terminal 38, a microphone 39, and a multi-use terminal 40 are provided on the bottom surface of the electronic device 10. The multi-use terminal 40 is compatible with a USB (Universal Serial Bus) and can be connected to other devices via a USB cable.

[Configuration of Left Side Surface Portion]

Figure 3C:
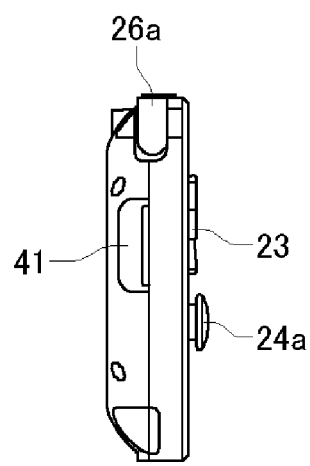
FIG. 3C is a diagram illustrating the left side surface of the electronic device.

FIG. 3C illustrates the left side surface of the electronic device 10. A SIM card slot 41 serving as a slot for inserting a SIM card is provided on the left side surface of the electronic device 10.

[Circuit Configuration of Electronic Device]

Figure 4:
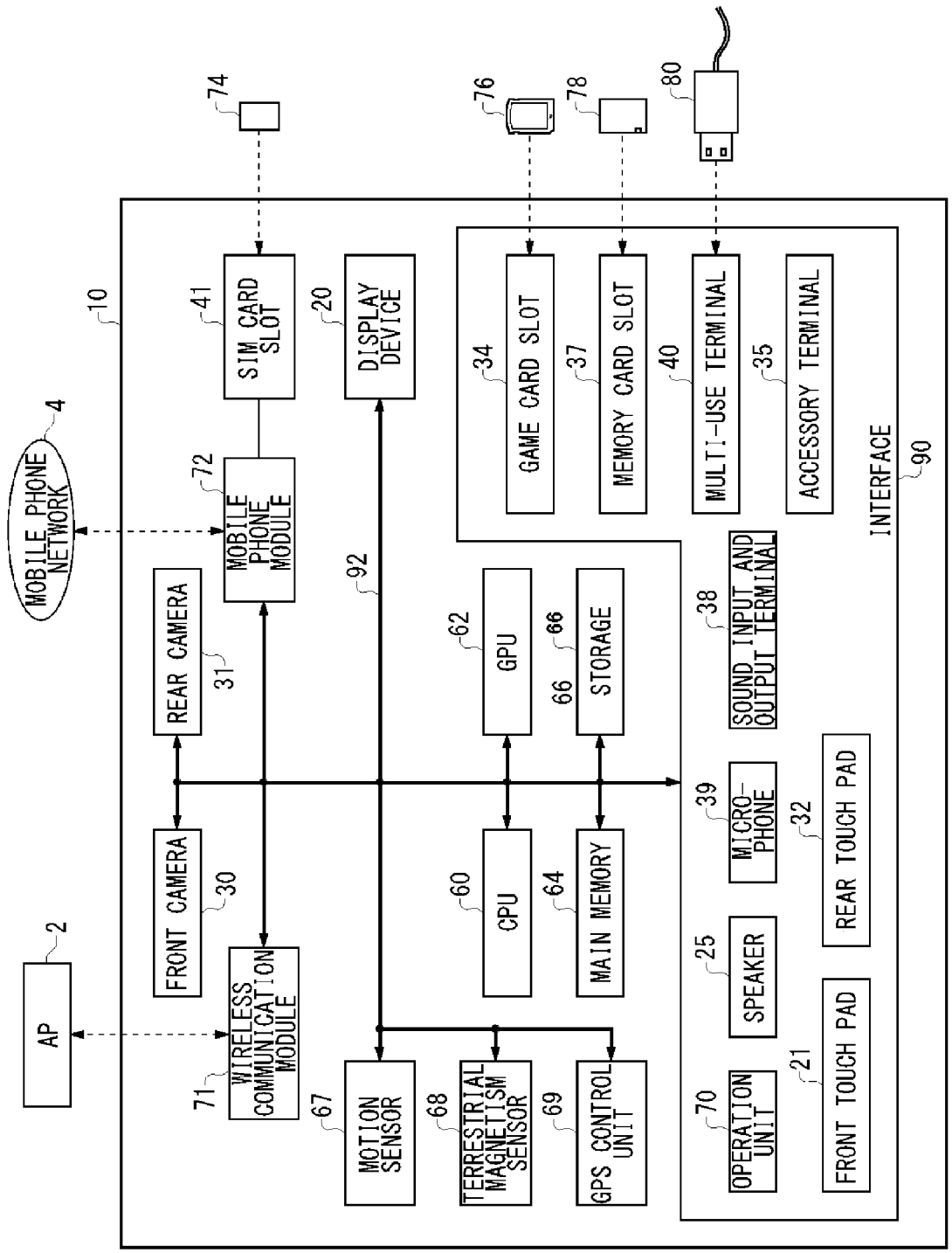
FIG. 4 is a diagram illustrating the circuit configuration of the electronic device.

FIG. 4 illustrates the circuit configuration of the electronic device 10. Components thereof are connected to one another via a bus 92. A wireless communication module 71 is formed with a wireless LAN module that complies with the communication standard of IEEE 802.11 b/g or the like and is connected to an external network via an AP 2. The wireless communication module 71 may have a communication function in Bluetooth (registered trademark) protocol. A mobile phone module 72 is compatible with a 3rd generation digital mobile phone method that complies with the IMT-2000 (International Mobile Telecommunication 2000) standard set by ITU (International Telecommunications Union) and is connected to a mobile phone network 4. A SIM card 74 in which a unique ID number for identifying the phone number of a mobile phone is recorded is inserted into the SIM card slot 41. The SIM card 74 being inserted into the SIM card slot 41 allows the mobile phone module 72 to communicate with the mobile phone network 4.

A CPU (Central Processing Unit) 60 executes a program or the like loaded in a main memory 64. A GPU (Graphics Processing Unit) 62 performs calculation necessary for image processing. The main memory 64 is configured with RAM (Random Access Memory) or the like and stores a program or data used by the CPU 60. A storage 66 is configured with a NAND-type flash memory or the like and used as a built-in auxiliary storage device. The display device 20 outputs an image generated by the CPU 60 or the like.

A motion sensor 67 detects the behavior of the electronic device 10, and a terrestrial magnetism sensor 68 detects terrestrial magnetism in a triaxial direction. A GPS control unit 69 receives a signal from a GPS satellite and calculates a current position. The front camera 30 and the rear camera 31 each capture an image and input image data. The front camera 30 and the rear camera 31 are configured with a CMOS image sensor (Complementary Metal Oxide Semiconductor Image Sensor).

In an interface 90, an operation unit 70 includes various operation means provided in the electronic device 10. More specifically, the operation unit 70 includes the operation buttons 22, the directional keys 23, the analog sticks 24, the L button 26a, the R button 26b, the HOME button 27, the START button 28, the SELECT button 29, the power button 33, the negative button 36a, and the positive button 36b. The front touch pad 21 and the rear touch pad 32 are multi-touch pads, and the front touch pad 21 is arranged being overlaid on the surface of the display device 20. The speakers 25 output a sound created by the functions of the electronic device 10, and the microphone 39 inputs a sound from around the electronic device 10. The sound input and output terminal 38 inputs a stereo sound from the external microphone and outputs the stereo sound to an external headphone or the like.

A game card 76 in which a game file is recorded is inserted into the game card slot 34. The game card 76 has a data-writable recording area. When the game card 76 is placed in the game card slot 34, data is written or read by a media drive. A memory card 78 is inserted into the memory card slot 37. The memory card 78, when placed in the memory card slot 37, is used as an external auxiliary storage device. The multi-use terminal 40 can be used as a USB terminal and exchanges data with another USB device when the USB cable 80 is connected to the multi-use terminal 40. To the accessory terminal 35, a peripheral device is connected.

The electronic device 10 displays a menu screen image on the touch panel 50 when the power is on. Icon images of a plurality of applications that can be executed by the electronic device 10 are arranged and displayed on the menu screen image. One of the icon images represents an icon image of a content manager that manages content, and the content manager is activated when the user taps the icon for the content manager. The content manager controls the file transfer processing between the electronic device 10 and the PC 5.

Figure 5:
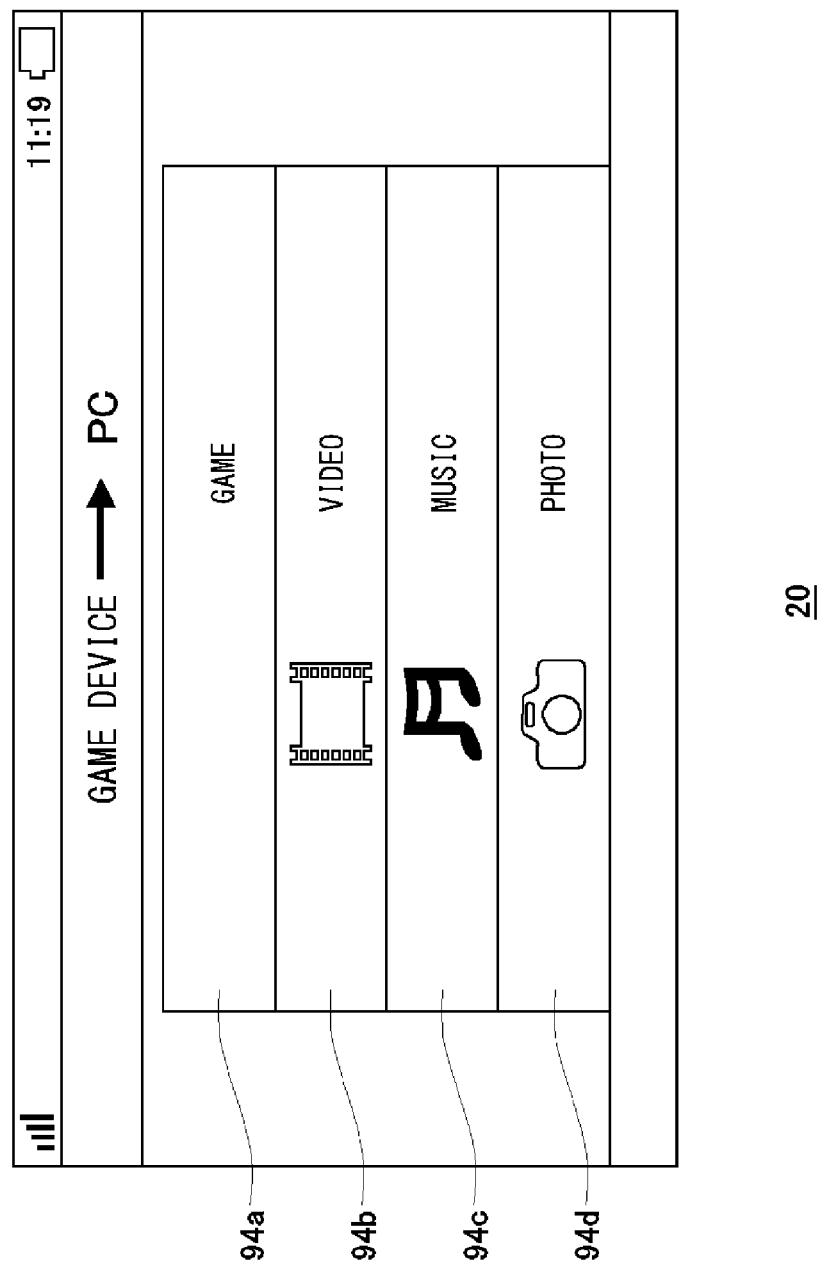
FIG. 5 is a diagram illustrating a genre selection screen image.

FIG. 5 shows a genre selection screen image for selecting the genre of content to be transferred. The content manager displays a plurality of genre selection areas 94 for selecting the genre of content on the display device 20. In an example shown in FIG. 5, a genre selection area 94a indicates a "game" genre, a genre selection area 94b indicates a "video" genre, a genre selection area 94c indicates a "music" genre, and a genre selection area 94d indicates a "photo" genre. When the user taps any one of the genre selection areas 94, a list of content files that belong to the genre is created and displayed.

When the genre selection area 94a is tapped, the content manager creates a list of games installed in the memory card 78. A video reproduction application, a music reproduction application, and a photo reproduction application are installed in the electronic device 10. A video list, a music list, and a photo list are created by respective reproduction applications. Therefore, when the genre selection area 94b is tapped, the video reproduction application creates a list of videos recorded in the memory card 78. When the genre selection area 94c is tapped, the music reproduction application creates a list of music recorded in the memory card 78. A list created when a genre selection area 94 is selected is hereinafter generically referred to as a "content list" regardless of the genre.

Figure 6:
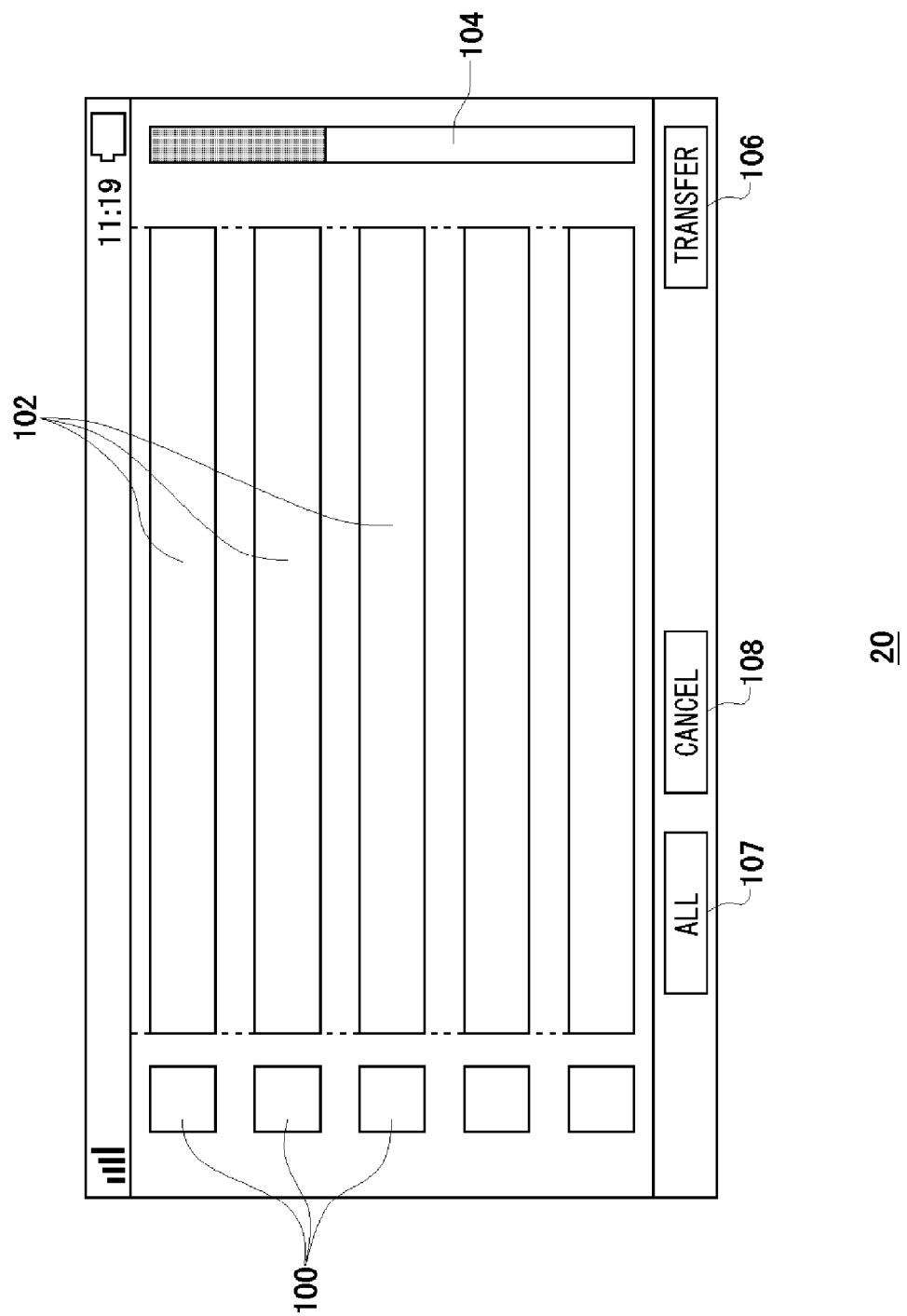
FIG. 6 is a diagram illustrating a list screen image.

FIG. 6 illustrates a list screen image created by each application. A content list, in which items 102 for specifying content files are arranged in the vertical direction, is displayed on the list screen image. For example, when a content genre is game, the items 102 include content information that includes a game package image, a game title, etc. When the content genre is video, the items 102 include content information that includes a video package image, a video title, etc.

A checkbox 100 is formed on the left side of each item 102 that is displayed. By tapping a checkbox 100, the user selects a content file that corresponds to the checkbox 100 as a content file to be transferred. When the user taps the checkbox 100, a mark indicating that the corresponding content file is selected is placed in the checkbox 100. A mark may be placed in the checkbox 100 when a corresponding item 102 is tapped. When all the items 102 included in a content list cannot be displayed on a single screen, a scroll bar 104 is formed, and the user will know that there are more items 102 in addition to items 102 that are displayed.

By sliding his/her finger on the front touch pad 21, the user can move the items 102. In the content list shown in FIG. 6, the items 102 are arranged in the vertical direction, and the user scrolls the content list by moving his/her finger in the vertical direction while touching the front touch pad 21. More specifically, when the user slides the finger in the upward direction, the content list moves in the upward direction, and when the user slides the finger in the downward direction, the content list moves in the downward direction. When the user taps a transfer button 106 after the selection of a content file to be transferred is completed, all content files that are selected are transferred to the PC 5. When the user taps an ALL button 107, all content files are selected. When the user taps a CANCEL button 108, a state where a content file is selected is canceled. Described above is an explanation of a content selection operation by a single touch.

As shown in FIG. 6, the number of items of content that can be displayed on a single screen is limited. In this example, up to five or six items 102 are displayed. Therefore, when selecting seven or more items of content successively arranged in the content list, the content selection operation by a single touch requires a task of tapping displayed checkboxes 100 and then moving the content list and tapping newly displayed checkboxes 100. In other words, when selecting many items of content, the user needs to alternately perform a tap operation and a scroll operation. Thus, a task of selecting the items of content requires time. In the present embodiment, a user interface is provided that realizes efficient content selection operation by multi-touch.

The electronic device 10 according to the present embodiment provides a user interface that allows the user to scroll a content list using a second finger while placing a first finger on a checkbox 100 so as to select or deselect one or more checkboxes 100 that pass under the first finger. The user interface is sometimes referred to as a "multi-touch UI" hereinafter.

Figure 7:
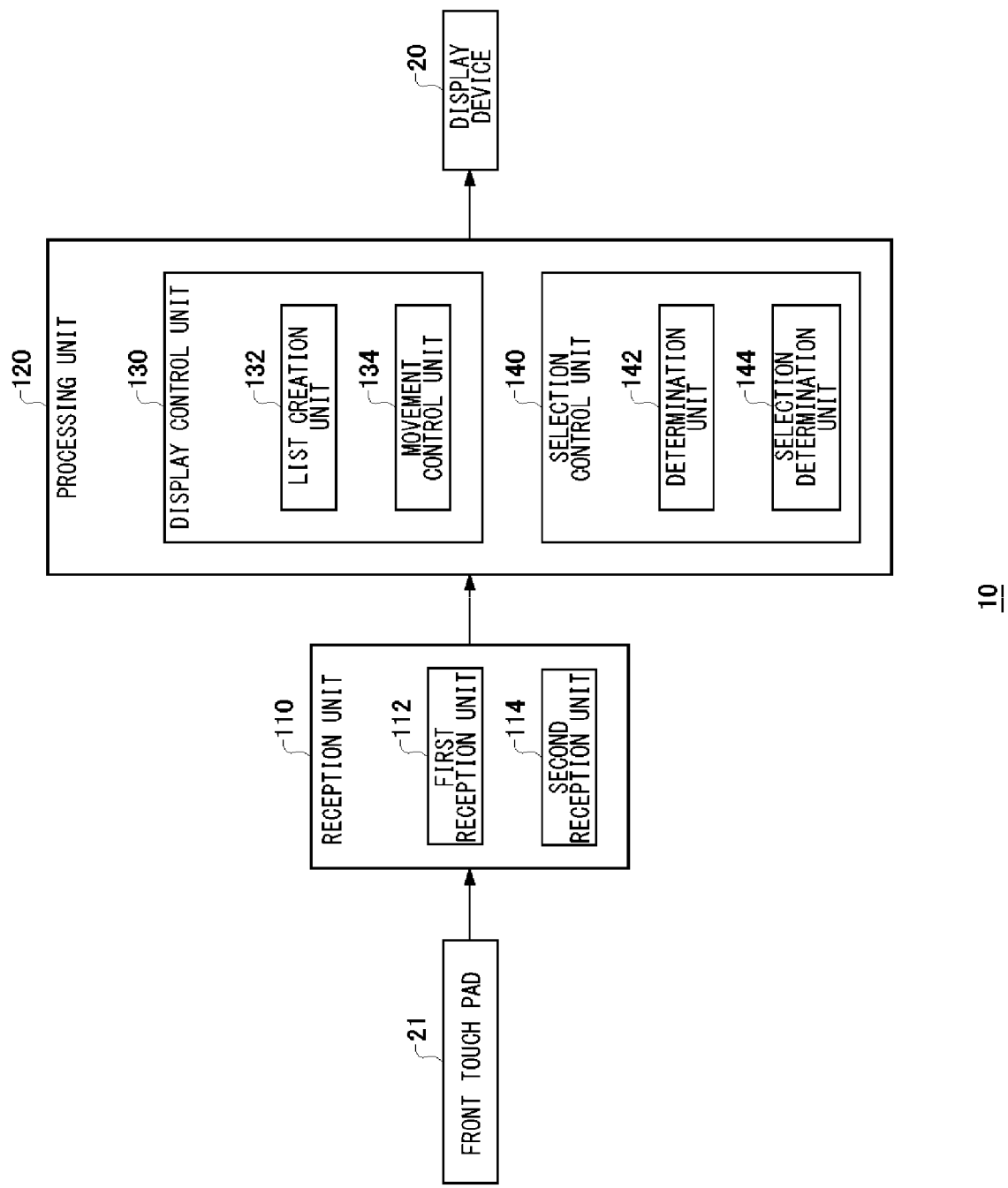
FIG. 7 is a diagram illustrating functional blocks of the electronic device according to an embodiment.

FIG. 7 illustrates functional blocks of the electronic device 10 that realizes a user interface according to the present embodiment. The electronic device 10 is provided with a reception unit 110 and a processing unit 120. The processing unit 120 has a display control unit 130 for displaying a list of items on the display device 20 and a selection control unit 140 for selecting or deselecting an item. These configurations are implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

The reception unit 110 receives a multi-touch operation from the user that is entered via the front touch pad 21. A first reception unit 112 receives a first touch operation entered in a selection area of an item, and a second reception unit 114 receives a second touch operation for moving an item list (content list).

Figure 8:
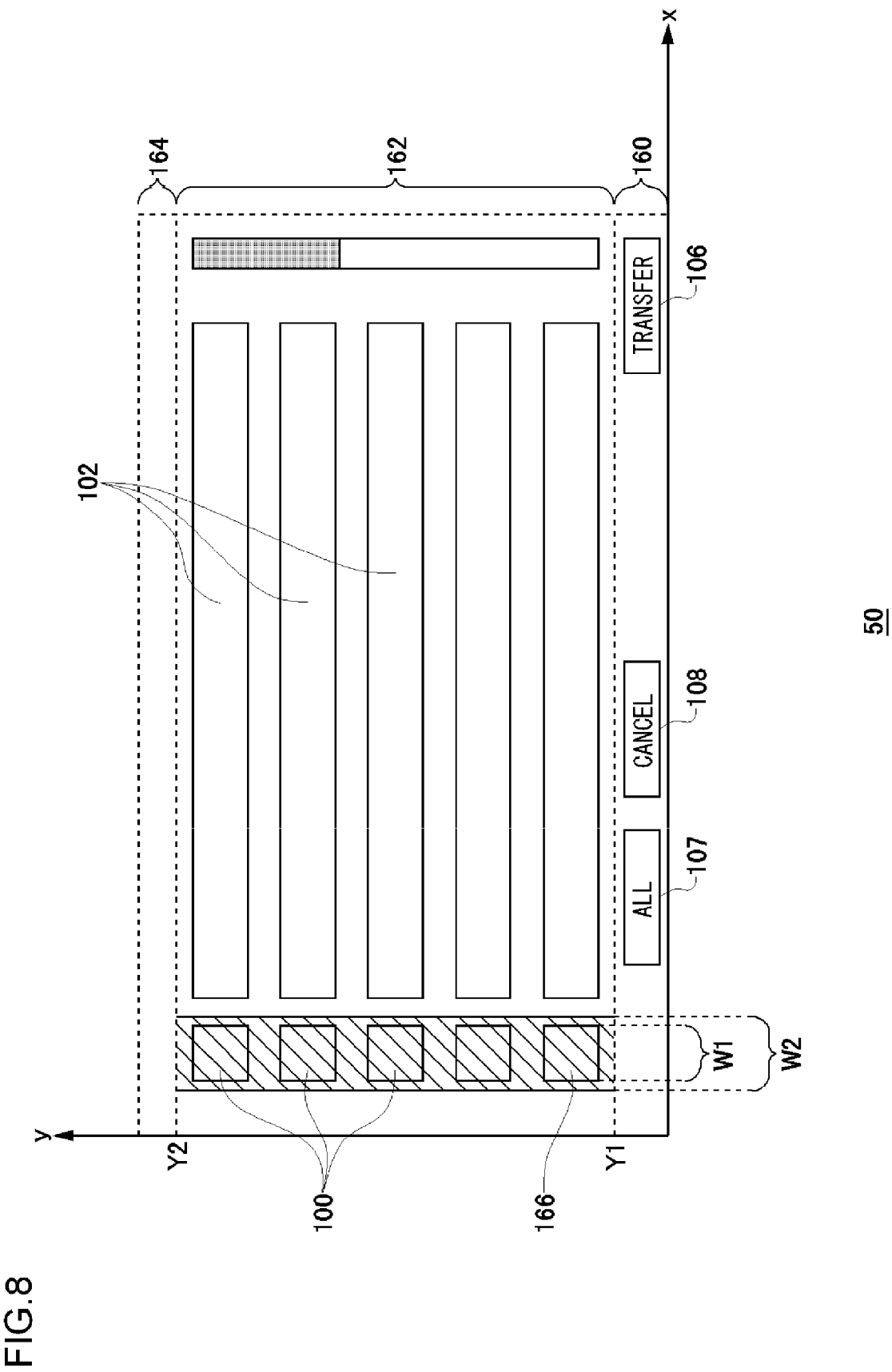
FIG. 8 is a diagram explaining a relationship between positional coordinates on a touch panel and display objects.

FIG. 8 is a diagram explaining a relationship between positional coordinates on the touch panel 50 and display objects. Based on the condition where the lower edge of the display is set to be an x-axis and the left edge thereof is set to be a y-axis, a coordinate system on the touch panel 50 is determined. A display area of the display is divided into three areas in the y-axis direction: a button area 160; a multi-touch effective area 162; and an indicator area 164.

The button area 160 is an area for arranging operation buttons such as the transfer button 106, the ALL button 107, and the CANCEL button 108. The indicator area 164 is an area for displaying an indicator for indicating time, a remaining battery level, a radio reception status, or the like. The multi-touch effective area 162 is an area for performing selection control including selection or deselection of an item 102 by a multi-touch operation. In the multi-touch effective area 162, a selection area 166 shown with diagonal lines is an area for receiving an operation of selecting an item 102. Areas other than the selection area 166 in the multi-touch effective area 162 is an area for receiving an operation for scrolling a content list.

The selection area 166 is formed such that the selection area 166 completely covers the display area of a checkbox 100 in the x-axis direction. As shown in the figure, the width W2 of the selection area 166 is preferably set to be larger than the width W1 of a checkbox 100. However, the width W2 and the width W1 may be set to be equal to each other.

Figure 9:
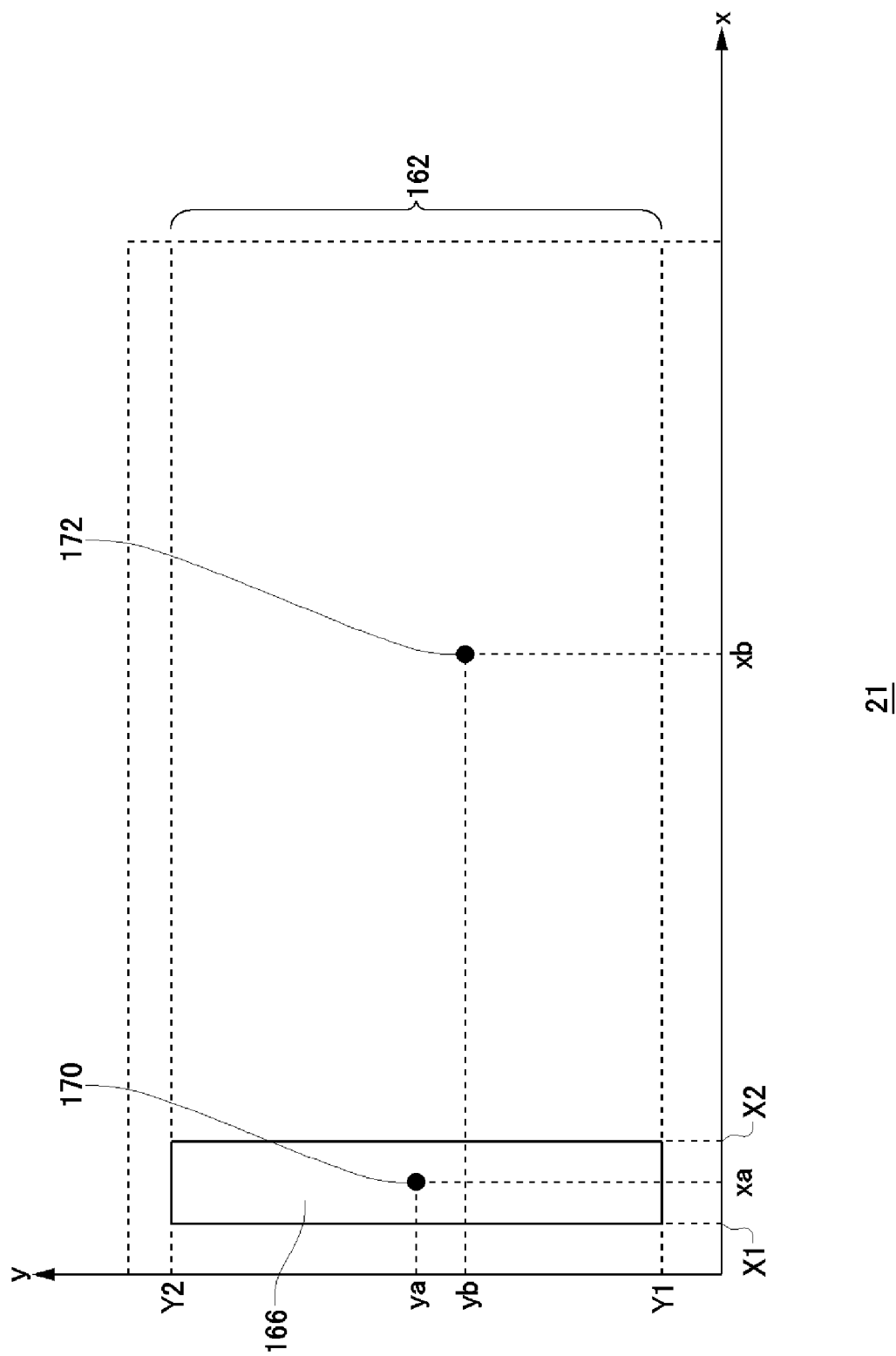
FIG. 9 is a diagram explaining a condition for executing a multi-touch UI.

FIG. 9 is a diagram explaining a condition for executing a multi-touch UI. A first touch point 170 indicates a contact location of a first finger detected on the front touch pad 21, and a second touch point 172 indicates a contact location of a second finger detected on the front touch pad 21. In order to execute the multi-touch UI, it is required that the first touch point 170 is located in the selection area 166 and that the second touch point 172 is located in an area other than the selection area 166 in the multi-touch effective area 162 at the same time. Therefore, when the first reception unit 112 receives a first touch operation entered in the selection area 166 for an item 102 and when the second reception unit 114 receives a second touch operation entered in an area other than the selection area 166, the processing unit 120 determines that requirements for executing the multi-touch UI are met. When the second touch point 172 is moved such that a scroll operation is entered, selection control of a content file by the multi-touch UI is performed.

When the first reception unit 112 receives the coordinates (xa, ya) of the first touch point 170, the first reception unit 112 determines that the first touch point 170 is located in the selection area 166 when the following conditions are met:

$X1 \leq xa \leq X2$, and $Y1 \leq ya \leq Y2$ When the second reception unit 114 receives the coordinates (xb, yb) of the second touch point 172, the second reception unit 114 determines that the second touch point 172 is located in an area other than the selection area 166 in the multi-touch effective area 162 when the following conditions are met:

$xb < X1$ or $X2 < xb$, and $Y1 \leq yb \leq Y2$

Figure 10:
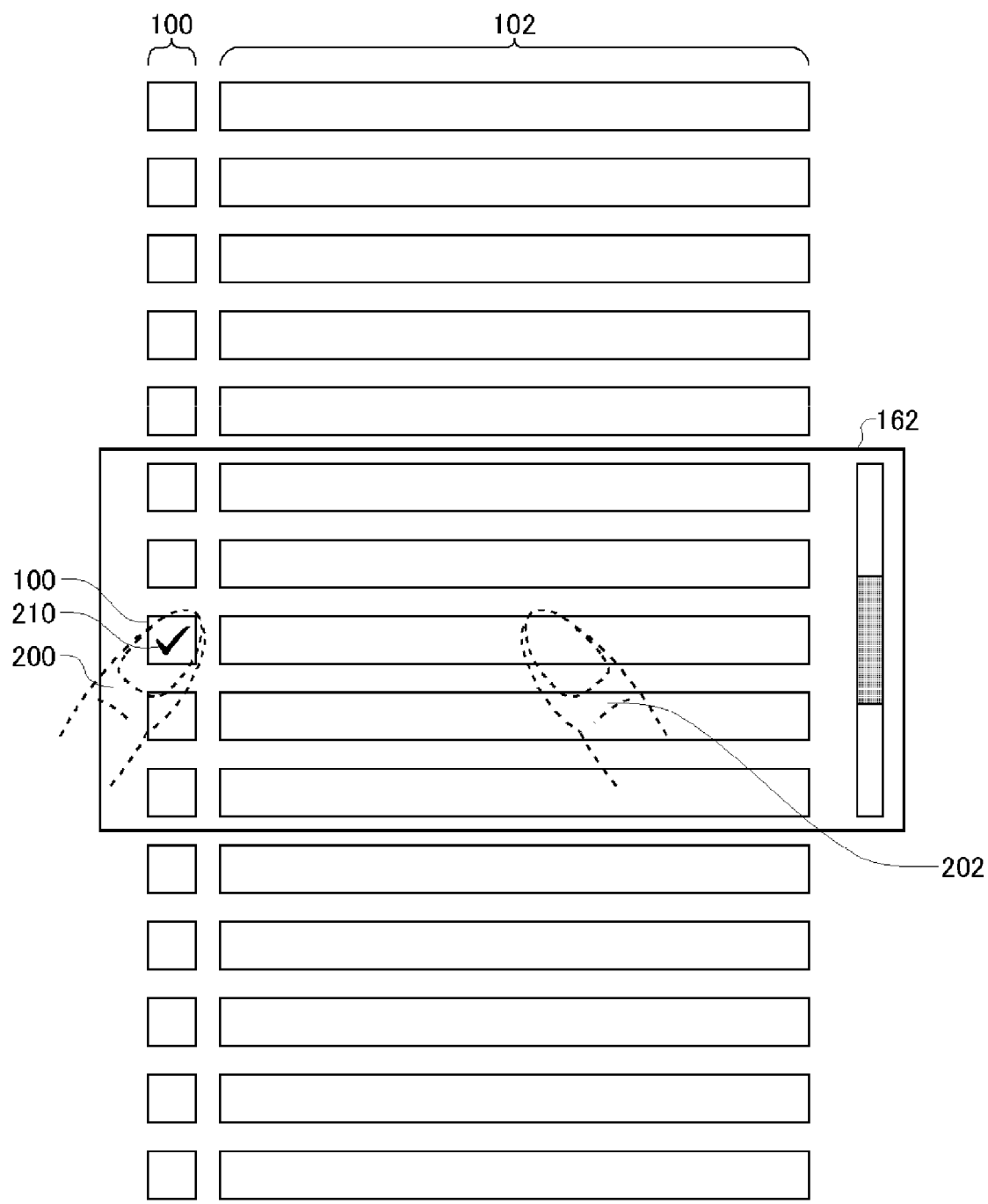
FIG. 10 is a diagram explaining selection control by the multi-touch UI.

FIG. 10 is a diagram explaining selection control by the multi-touch UI. When the user selects a genre in the genre selection screen image shown in FIG. 5, a list creation unit 132 in the display control unit 130 (in reference to FIG. 7) creates a content list for the selected genre and displays the content list on the display device 20. In an example shown in FIG. 10, the list creation unit 132 has created a content list including fifteen items of content. The list creation unit 132 displays the content list from top item. Therefore, the top five items 102 are displayed in the multi-touch effective area 162 in the initial state of the list display. For the sake of ease of explanation, FIG. 10 shows sixth through tenth items 102 being displayed in the multi-touch effective area 162. The display state shown in FIG. 10 is obtained by scrolling the content list in the upward direction by one screen image, starting from the initial state of the list display.

A first finger 200 touches an eighth checkbox 100 from the top in the list, and a second finger 202 touches an area other than the selection area 166. By acquiring a specified position specified by the first finger 200 on the front touch pad 21 from the first reception unit 112 and by acquiring the positional coordinates of a check area for determining that the checkbox 100 has been tapped from the list creation unit 132, a determination unit 142 determines whether the positional coordinates of the first finger 200 are included in the check area of the checkbox 100.

Figure 11A:
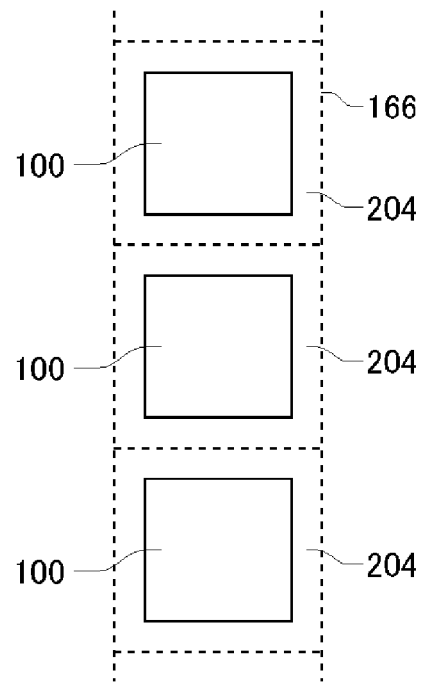
FIG. 11A is a diagram explaining determination processing performed by a determination unit.

FIG. 11A is a diagram explaining determination processing performed by the determination unit 142. As described previously, the width W2 of the selection area 166 is set to be larger than the width W1 of the checkbox 100 in the x-axis direction. In the present embodiment, a plurality of checkboxes 100 that are displayed are not continuous in the y-axis direction. However, a check area 204 used to determine that a checkbox 100 has been tapped may be set to be larger than the checkbox 100, and a plurality of check areas 204 may be continuous in the y-axis direction. With this, even when the user taps at a position that is slightly outside the checkbox 100, the determination unit 142 can detect the check area 204 that includes the first touch point 170 as long as the position specified by the touch operation (the first touch point 170) is in the selection area 166.

Figure 11B:
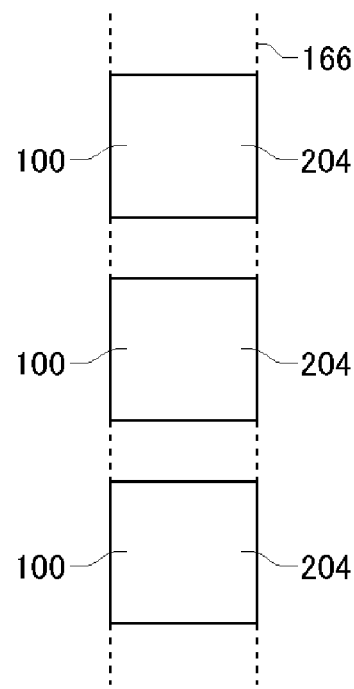
FIG. 11B is another diagram for an explanation.

FIG. 11B illustrates another example of a check area 204. In this example, a check area 204 is set to be equal to the area of a checkbox 100. This is an example where the width W2 of the selection area 166 is set to be equal to the width W1 of a checkbox 100 and where check areas 204 are not continuous in the y-axis direction.

In the example shown in FIG. 10, the determination unit 142 determines that the specified position specified by the first finger 200 is included in the check area 204 of the eighth checkbox 100 from the top. In response to this determination result, a selection determination unit 144 determines that the eighth item 102 has been selected and displays a mark 210 in the checkbox 100.

An explanation is given regarding selection control of the multi-touch UI performed when the second finger 202 slides in the upward direction while being in a state shown in FIG. 10. The first finger 200 is not moved at this time, and the first finger 200 continues to specify the same position on the front touch pad 21.

A movement control unit 134 moves the content list in the upward direction in accordance with the touch operation of the second finger 202 received by the second reception unit 114. The slide operation of the second finger 202 in the upward direction received by the second reception unit 114 is recognized as an upward scroll instruction in the movement control unit 134. Therefore, the movement control unit 134 scrolls the content list in the upward direction.

Figure 12:
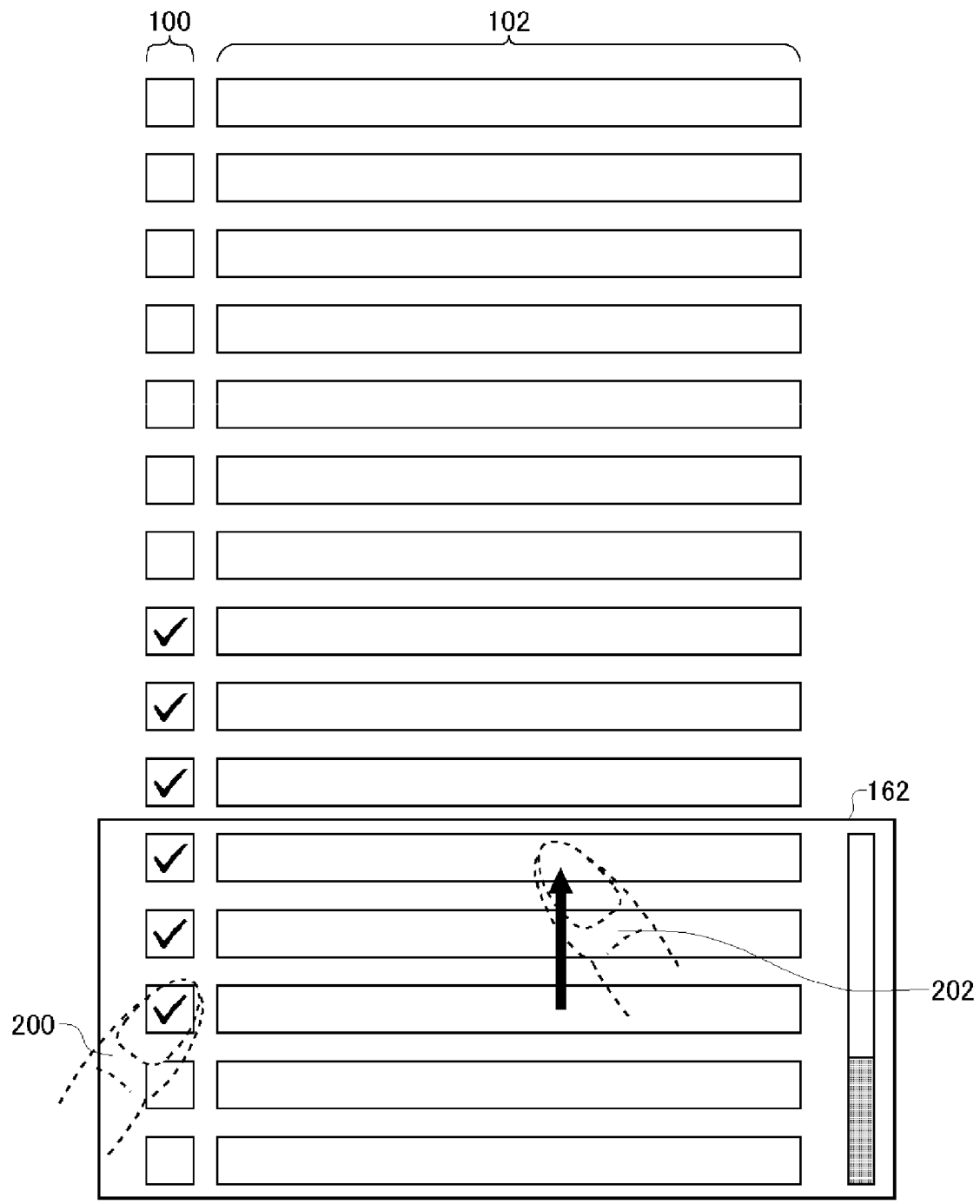
FIG. 12 is a diagram illustrating the status of checkboxes obtained when a content list is scrolled to the limit in the upward direction.

FIG. 12 illustrates the status of checkboxes 100 obtained when the content list is scrolled to the limit in the upward direction. In a process of moving the content list in the upward direction, when the determination unit 142 determines that the specified position specified by the first finger 200 is included in a check area 204 of a checkbox 100 below the eighth checkbox 100 (i.e., the ninth or any subsequent checkbox 100), the selection determination unit 144 determines that an item 102 corresponding to the check area 204 has been selected and displays a mark 210 in the corresponding checkbox 100. The multi-touch UI according to the present embodiment allows a corresponding item 102 to be selected when a check area 204 passes through a specified position in the selection area 166 and allows a mark 210 to be added in a corresponding checkbox 100. This allows a task of selecting a plurality of successive items 102 to be easily performed.

Similarly, an explanation is given regarding selection control of the multi-touch UI performed when the second finger 202 slides downward in the state shown in FIG. 10. The first finger 200 is not moved, and the first finger 200 continues to specify the same position on the front touch pad 21.

A movement control unit 134 moves the content list in the downward direction in accordance with the touch operation of the second finger 202 received by the second reception unit 114. The slide operation of the second finger 202 in the downward direction received by the second reception unit 114 is recognized as a downward scroll instruction in the movement control unit 134. Therefore, the movement control unit 134 scrolls the content list in the downward direction.

Figure 13:
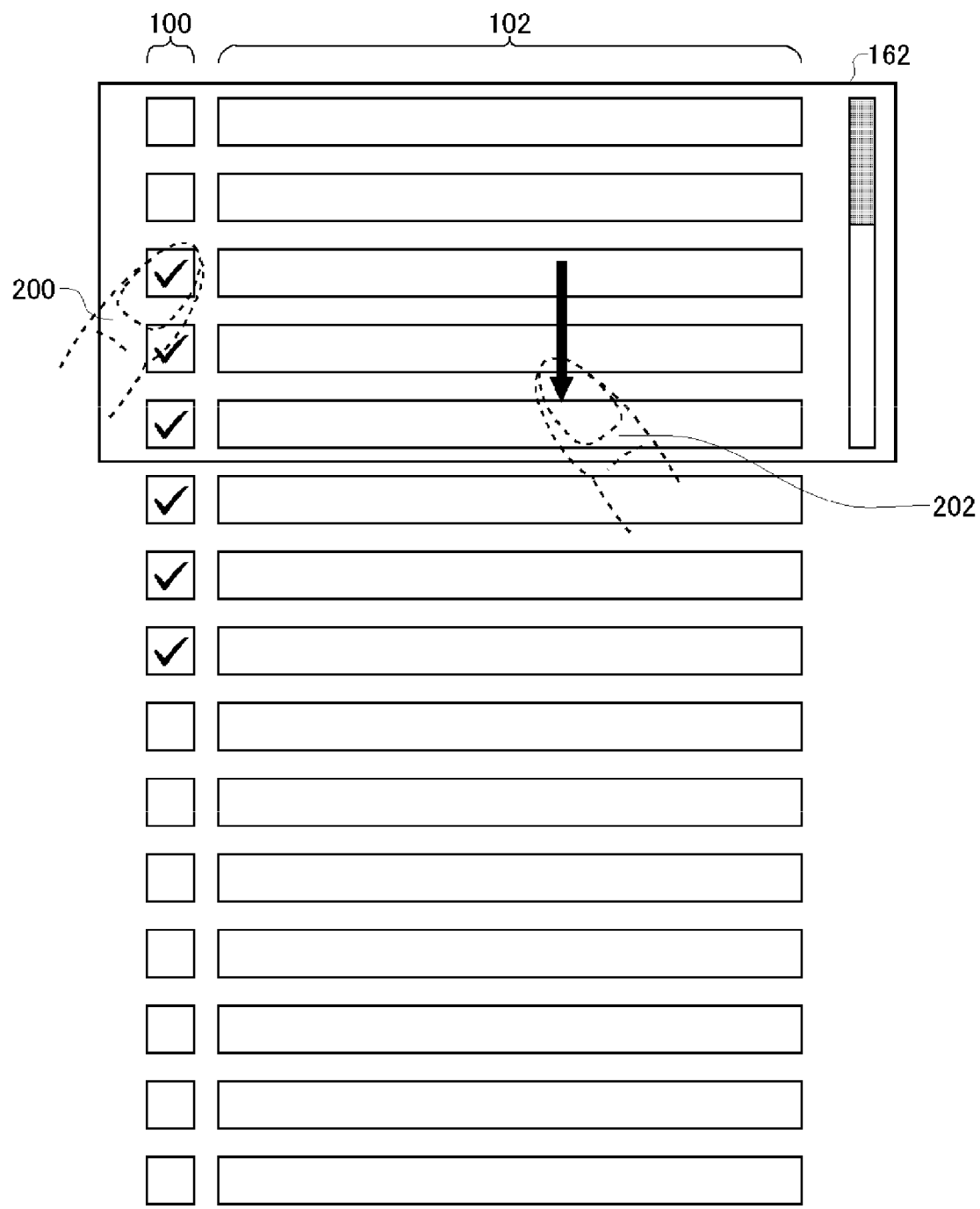
FIG. 13 is a diagram illustrating the status of the checkboxes obtained when the content list is scrolled to the limit in the downward direction.

FIG. 13 illustrates the status of checkboxes 100 obtained when the content list is scrolled to the limit in the downward direction. In a process of moving the content list in the downward direction, when the determination unit 142 determines that the specified position specified by the first finger 200 is included in a check area 204 of a checkbox 100 above the eighth checkbox 100 (i.e., the seventh or any previous checkbox 100), the selection determination unit 144 determines that an item 102 corresponding to the check area 204 has been selected and displays a mark 210 in the corresponding checkbox 100. This allows the task of selecting a plurality of successive items 102 to be easily performed.

Described above is the basic selection control by the multi-touch UI. When the second touch operation received by the second reception unit 114 contains both an instruction for scrolling in a first direction and an instruction for scrolling in a second direction, the multi-touch UI has two options for selection control. An explanation is given regarding selection control performed when the content list is scrolled to the limit in the upward direction and then scrolled to the limit in the downward direction, starting from the state shown in FIG. 10. When the content list is scrolled to the limit in the upward direction, the eighth through thirteenth items 102 are determined to be selected, as shown in FIG. 12. The user then scrolls the content list, starting from the state shown in FIG. 12 to a state shown in FIG. 13.

<Option 1>

Figure 14:
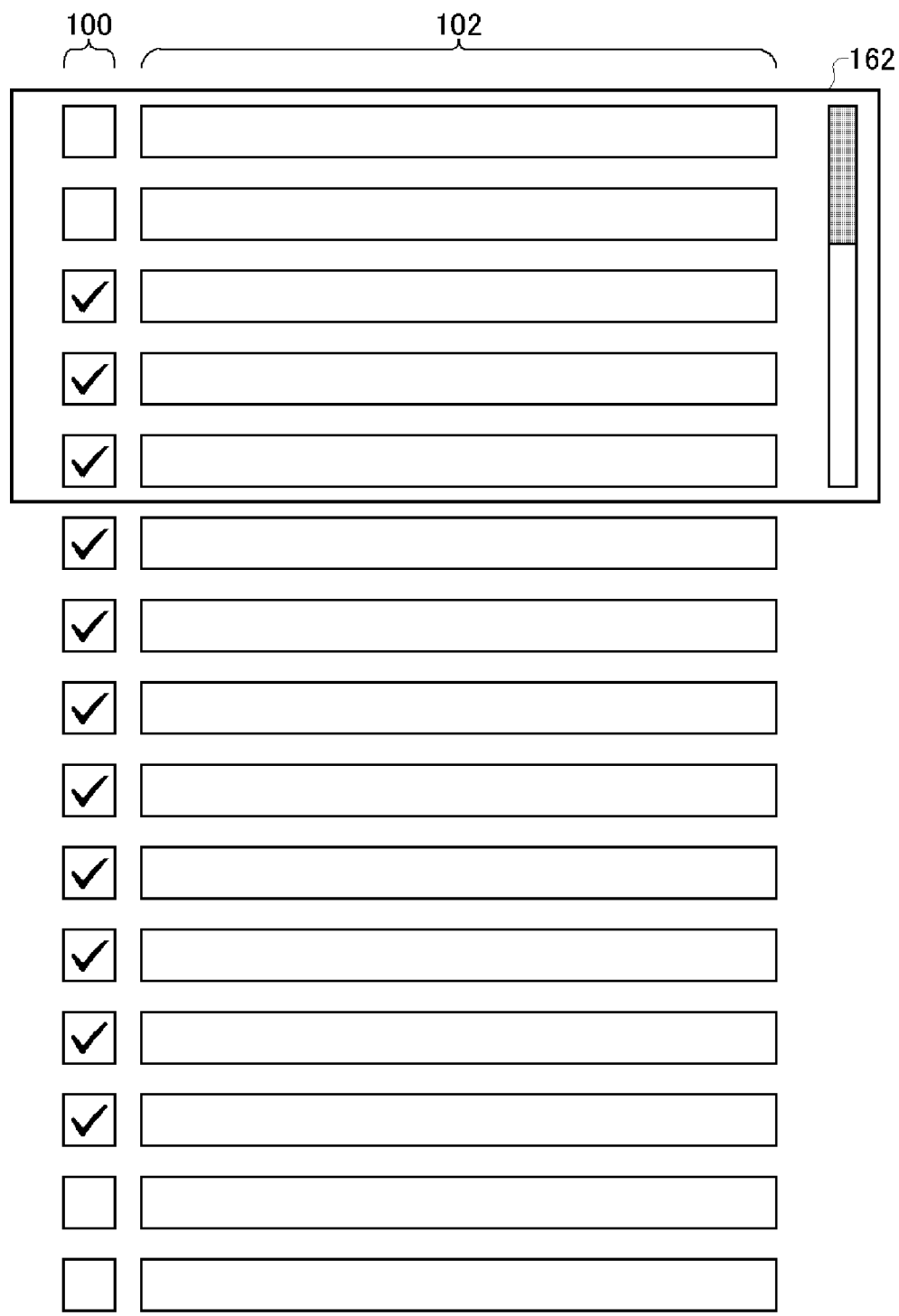
FIG. 14 is a diagram illustrating an example of the status of the checkboxes.

FIG. 14 illustrates an example of the status of checkboxes 100 in the content list. In the option 1, when the determination unit 142 determines that a specified position specified by the first finger 200 is included in a check area 204, the selection determination unit 144 determines that the item 102 has been selected and does not change the status of determination. In other words, regarding an item 102 that has been selected once, even when the determination unit 142 determines again that a specified position specified by the first finger 200 is included in a check area 204 of the selected item 102, the status where the item 102 is determined to be selected does not change. Therefore, the number of selected items 102 does not become decreased in the selection control by the multi-touch UI in the option 1. This option 1 is effectively used when an item 102 desired to be selected exists above or below a position at which the first finger 200 is first placed.

<Option 2>

Figure 15:
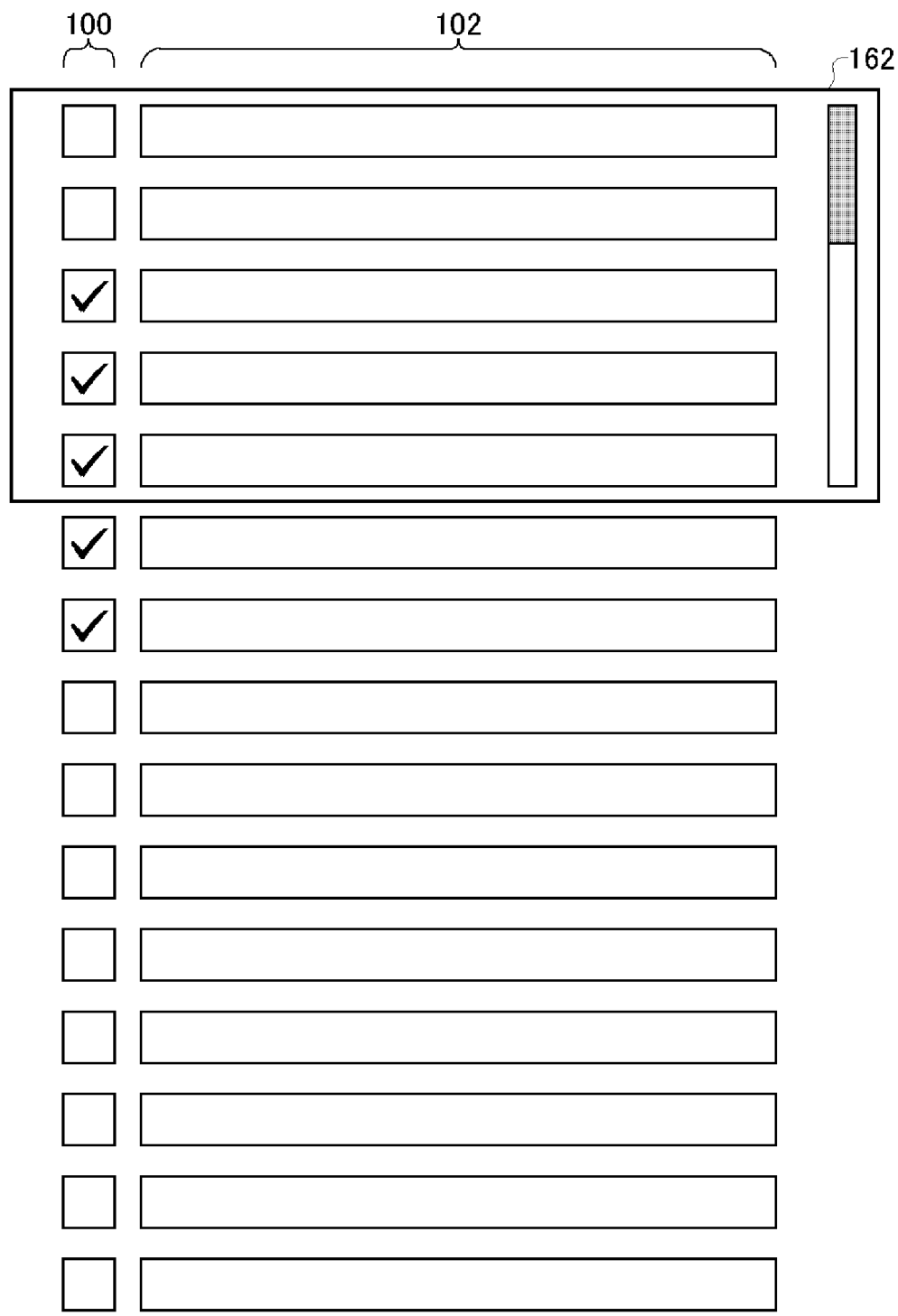
FIG. 15 is a diagram illustrating another example of the status of the checkboxes.

FIG. 15 illustrates another example of the status of the checkboxes 100 in the content list. In the option 2, when the determination unit 142 determines that a specified position specified by the first finger 200 is included in a check area 204, the selection determination unit 144 reverses the status value of the item 102. A selected state and a deselected state exist in the status value of the item 102. Reversing the status value includes changing the selected state to the deselected state and changing the deselected state to the selected state. Therefore, if the determination unit 142 determines that a specified position specified by the first finger 200 is included in a corresponding check area 204 when a scroll operation in a second direction opposite from a first direction is entered while a given item 102 is determined to be selected by a scroll operation in the first operation, the selected state of the item 102 is reversed to the deselected state. In contrast, when a scroll operation is performed while a given item 102 is in a deselected state (including a non-selected state) such that the determination unit 142 determines that a specified position specified by the first finger 200 is included in a corresponding check area 204, the deselected state of the item 102 is reversed to the selected state. This option 2 is effectively used when the user first picks a wrong scroll direction and then corrects the scroll direction.

The selection control unit 140 performs selection control including selection or deselection of an item 102 when the first reception unit 112 continues to receive a first touch operation. The selection control unit 140 ends the selection control when the first reception unit 112 ceases to receive a first touch operation. In the present embodiment, selection control performed after the requirements for executing the multi-touch UI are met until the requirements become failed is counted as one event of selection control. Having a first touch operation in the selection area 166 is one of the requirements for executing the multi-touch UI. Thus, the user's first finger 200 needs to be specifying the selection area 166 in order for the selection control unit 140 to continue the selection control. Once the multi-touch UI is executed, the selection control unit 140 may continue the selection control even when the first finger 200 moves outside the selection area 166. In the present embodiment, the content list moves in the y-axis direction. Thus, the determination unit 142 may determine whether or not the y-coordinate of a moving check area 204 has passed through the y-coordinate (ya) of a specified position specified by the first finger 200 in the scroll direction. When it is determined that the y-coordinate of the moving check area 204 has passed through the y-coordinate (ya) of the specified position, the determination unit 142 may determine that the specified position specified by the first finger 200 is included in the check area 204.

Reverse processing performed on the status value of an item 102 according to the option 2 is used in a single event of selection control where scroll operation is performed consecutively in two directions. However, the reverse processing may be used in the case where the scroll operation is not performed consecutively, i.e., in the case of, not limited to a single event of selection control, but also a different number of events of selection control. In other words, the selection determination unit 144 may use a determination result obtained by the determination unit 142 to reverse the status value of an item 102 and determine the status value of the item 102 in accordance with the status value obtained before the determination unit 142 determines that a specified position of the first finger 200 is included in a check area 204.

Described above is an explanation based on the embodiments of the present invention. These exemplary embodiments are intended to be illustrative only, and it will be obvious to those skilled in the art that various modifications to constituting elements and processes could be developed and that such modifications are also within the scope of the present invention. In the embodiments, an example of transferring the selected file is shown as processing performed after a content file is selected. However, for example, the selected file may be copied or deleted. Alternatively, other various kinds of processing may be performed.

In the embodiments, it is shown that a plurality of successive items 102 can be selected by scrolling the content list while the first finger 200 is placed in the selection area 166. The plurality of items 102 may be determined to stay selected at the time when the plurality of items 102 are selected. Alternatively, the plurality of items 102 may not be determined to stay selected at the time when the plurality of items 102 are selected but may be determined to stay selected when the first finger 200 is removed from the front touch pad 21. In this case, in order to show that the selection is not determined to stay, the mode of a mark 210 displayed in a checkbox 100 is preferably set to be different from the mode of a mark 210 that indicates that the selection has been determined to stay. Therefore, the mark 210 is displayed in a mode that indicates that the selection is not determined to stay when the first finger 200 is placed in the selection area 166, and the mark 210 is displayed in a mode that indicates that the selection is determined to stay when the first finger 200 is removed from the front touch pad 21. For example, these display modes may be realized by changing the color. Alternatively, the display modes may be realized by changing the size of the mark 210. By changing the display mode of the mark 210 as described above, the user can easily distinguish an item 102 determined to stay selected and an item 102 not determined to be selected from each other.

For example, when the first finger 200 moves to the left or right going outside the selection area 166 while touching the front touch pad 21 and is removed from the front touch pad 21 at a position outside the selection area 166, the selection determination unit 144 may deselect an item 102 that is temporarily selected (that is not determined to stay selected). As described above, when the first finger 200 located in the selection area 166 is removed from the front touch pad 21 while an item 102 is temporarily selected, the temporary selection of the item 102 is determined to stay. Meanwhile, when the first finger 200 located in an area other than the selection area 166 is removed from the front touch pad 21, the temporary selection of the item 102 is canceled. A mark 210 for an temporarily-selected item 102 has a display mode that is different from that of a mark 210 for an item 102 determined to stay selected. Thus, the user can easily distinguish the temporarily-selected item 102 and can determine the temporary selection to stay or cancel the temporary selection by an easy operation.

The display of a mark 210 indicating a temporarily-selected state may be deleted when the first finger 200 moves to the left or right going outside the selection area 166 while touching the front touch pad 21. This allows the user to learn that removing the first finger 200 from the front touch pad 21 in that state will cancel the selection of a temporarily-selected item 102. By moving the first finger 200 to the selection area 166 while being in that state, the display of the mark 210 indicating the temporarily-selected state may be restored so that the state of the mark 210 before the deletion of the display is recreated.

When the first finger 200 slides within the selection area 166 while the second finger 202 is not in contact with the front touch pad 21, only an item 102 corresponding to a check area 204 touched first is selected. However, for example, the bottom two items 102 are not being selected in the status of checkboxes 100 shown in FIG. 12, and it is thus preferred to be able to select the two non-selected items 102 by sliding the first finger 200. Therefore, based on the condition that the requirements for executing the multi-touch UI are met, the items 102 may be allowed to be selected by scrolling the first finger 200 in the downward direction in the selection area 166.

Preferably, operation buttons such as the transfer button 106, the ALL button 107, and the CANCEL button 108 are disabled during the selection control by the multi-touch UI so that the buttons cannot be operated. The selection control unit 140 can prevent an erroneous operation entered by the user beforehand by disabling a button operation during the selection control.

What is claimed is:

1. An electronic device configured to efficiently transfer content files to a second device, said electronic device comprising:
    a multi touch display screen configured to accept a multi-touch operation from a user, said multi touch display screen comprising:
    a first reception unit configured to receive a first touch operation performed in a first selection area having a columnar configuration with respect to a scrolling direction and in which a user provides a single touch location to select one or more check boxes, each corresponding to an item from a list of items, wherein one or more of said items are selected for transfer to said second device, wherein said first selection area is adjacent to a first edge of said display screen,
    a second reception unit configured to receive a second touch operation performed in a second area comprising substantially all but the first selection area of said multi touch display screen, said second touch operation comprising a scrolling operation wherein said user uses touch input to scroll through said list of items corresponding to content files stored in a memory card of said device, wherein said second selection area is adjacent to a second edge of said display screen, said second edge being opposite said first edge,
    wherein multiple items are selected by providing the single touch location in the first selection area of columnar configuration such that the single touch location is over said check boxes as they pass by said single touch location while said items are scrolled, and the first and second touch operations occur simultaneously.

2. The electronic device according to claim 1 wherein the selection control unit selects more than one item sequentially as a function of the movement of the list of items, selected items being determined by the items in said list of items that intersect with the single touch location specified by the first touch operation, while the first touch operation continues.

3. The electronic device according to claim 1,
    wherein the selection control unit performs selection control, including selection and/or deselection of an item, while said first touch operation continues,
    and wherein the selection control unit ends the selection control when said first touch operation ceases.

4. A touch operation processing method comprising:
    displaying a list of items on a display device;
    receiving a first touch operation performed in a first selection area having a columnar configuration with respect to a scrolling direction and in which a user provides a single touch location to select one or more check boxes, each corresponding to an item from a list of items, wherein one or more of said items are selected for transfer to said second device, wherein said first selection area is adjacent to a first edge of said display screen,
    receiving, simultaneously with said first touch operation, a second touch operation performed in a second area comprising substantially all but the first selection area of said multi touch display screen, said second touch operation comprising a scrolling operation wherein said user uses touch input to scroll through said list of items corresponding to content files stored in a memory card of said device, wherein said second selection area is adjacent to a second edge of said display screen, said second edge being opposite said first edge,
    wherein multiple items are selected by providing the single touch location in the first selection area of columnar configuration such that the single touch location is over said check boxes as they pass by said single touch location while said items are scrolled, and the first and second touch operations occur simultaneously.

5. A non-transitory computer-readable recording medium having embodied thereon the computer program comprising:
    a module configured to display a list of items on a display device;
    a module configured to receive a first touch operation performed in a first selection area having a columnar configuration with respect to a scrolling direction and in which a user provides a single touch location to select one or more check boxes, each corresponding to an item from a list of items, wherein one or more of said items are selected for transfer to said second device, wherein said first selection area is adjacent to a first edge of said display screen;
    a module configured to receive simultaneously with said first touch operation a second touch operation performed in a second area comprising substantially all but the first selection area of said multi touch display screen, said second touch operation comprising a scrolling operation wherein said user uses touch input to scroll through said list of items corresponding to content files stored in a memory card of said device, wherein said second selection area is adjacent to a second edge of said display screen, said second edge being opposite said first edge,
    a module configured to select multiple items in response to the single touch location in the first selection area of columnar configuration such that the single touch location is over said check boxes as they pass by said single touch location while said items are scrolled, and the first and second touch operations occur simultaneously.

6. The touch operation processing method of claim 4 wherein each of said more than one item is selected sequentially while the first touch operation continues.

7. The non-transitory computer-readable recording medium of claim 5 wherein each of said more than one item is selected sequentially while the first touch operation continues.

8. The electronic device according to claim 1, wherein said multi touch display screen is a touch panel provided on the front surface of said electronic device, said touch panel formed by a touch pad overlaying a display of said electronic device.

9. The electronic device according to claim 8, further comprising a second touch panel on the rear face of said electronic device.

10. The electronic device according to claim 1, wherein said multi touch display screen is a separate device connected to said electronic device.

11. The electronic device according to claim 1, further comprising a content manager configured to display a genre selection screen image comprising a plurality of genre selection areas for selecting the genre of said items to be transferred.

12. The electronic device according to claim 11, wherein said plurality of genre selection areas comprise: a genre selection area, a video genre selection area, a music genre selection area, and a photo genre selection area, wherein tapping one of said genre selection areas causes said content manager to generate and display said list of items, each of which correspond to a content file belonging to said genre.

13. The electronic device according to claim 1, wherein each of said items comprise content information including an image representing said content file, and a title of said content file.

14. The electronic device according to claim 1, wherein a user selects an item representing a content file by tapping its corresponding checkbox.

15. The electronic device according to claim 1, further comprising a transfer button that a user taps in order to transfer one or more of said content files selected for transfer to said second device.

16. The electronic device according to claim 1, wherein a user must perform a first touch operation in the first selection area and a second touch operation in the second area of said multi touch display screen, at the same time, in order to use the multi touch display screen.

17. The electronic device according to claim 1, further comprising a storage area having a virtual CD ROM stored therein, said virtual CD ROM comprising computer readable code for an installer, wherein said installer installs a server acquired driver onto said second device to enable media transfer from said electronic device to said second device when said electronic device does not detect a driver in said second device for executing the media transfer protocol.

18. The electronic device according to claim 1, wherein a single column of check boxes is displayed on said multi touch display screen, from which the user selects said one or more check boxes.

* * * * *